United States Patent
Grau et al.

(10) Patent No.: US 12,025,767 B2
(45) Date of Patent: Jul. 2, 2024

(54) MEASURING SPECTRAL CONTRIBUTIONS OF ELEMENTS IN REGIONS IN AND ABOUT A BOREHOLE USING A BOREHOLE SPECTROSCOPY TOOL

(71) Applicant: Schlumberger Technology Corporation, Sugar Land, TX (US)

(72) Inventors: James Anthony Grau, Marshfield, MA (US); Jeffrey Miles, Arlington, MA (US); Laurent Mosse, Abu Dhabi (AE)

(73) Assignee: Schlumberger Technology Corporation, Sugar Land, TX (US)

( * ) Notice: Subject to any disclaimer, the term of this patent is extended or adjusted under 35 U.S.C. 154(b) by 770 days.

(21) Appl. No.: 16/972,022

(22) PCT Filed: Jun. 3, 2019

(86) PCT No.: PCT/US2019/035231
§ 371 (c)(1),
(2) Date: Dec. 4, 2020

(87) PCT Pub. No.: WO2019/236489
PCT Pub. Date: Dec. 12, 2019

(65) Prior Publication Data
US 2021/0231827 A1 Jul. 29, 2021

Related U.S. Application Data

(60) Provisional application No. 62/680,024, filed on Jun. 4, 2018.

(51) Int. Cl.
*G01N 23/222* (2006.01)
*E21B 47/003* (2012.01)
(Continued)

(52) U.S. Cl.
CPC ............ *G01V 5/101* (2013.01); *E21B 47/003* (2020.05); *E21B 47/114* (2020.05);
(Continued)

(58) Field of Classification Search
CPC ...... G01N 23/222; G01V 5/0069; G01V 5/10; G01V 5/101; G01V 5/102; G01V 5/104; G01V 5/105; G01V 5/107; G01V 5/108
(Continued)

(56) References Cited

U.S. PATENT DOCUMENTS 4,464,569 A * 8/1984 Flaum .................... G01V 5/102
250/269.6
4,661,701 A * 4/1987 Grau ...................... G01V 5/101
376/160
(Continued)

FOREIGN PATENT DOCUMENTS

WO 2017214325 A1 12/2017

OTHER PUBLICATIONS

Grau, J. A., , "A Geochemical Model for Gamma ray Spectroscopy Logging Measurements", Nuclear Geophysics, 1989, 3(4), pp. 351-359, 1989.
(Continued)

*Primary Examiner* — Allen C. Ho
(74) *Attorney, Agent, or Firm* — Ashley E. Brown (57) ABSTRACT

An earth formation traversed by a borehole is investigated. A borehole tool having a neutron source and a photon detector is located in the borehole and used to obtain photon scatter information in or about the borehole. A chemical element located in a region in or about the borehole is quantified by using the photon scatter information and at least two different spectral standards for that element.

20 Claims, 9 Drawing Sheets

(51) Int. Cl.
   *E21B 47/113*     (2012.01)
   *E21B 49/08*      (2006.01)
   *G01V 5/10*       (2006.01)
   *G01V 5/22*       (2024.01)

(52) U.S. Cl.
   CPC ....... *E21B 49/0875* (2020.05); *G01N 23/222* (2013.01); *G01V 5/234* (2024.01)

(58) Field of Classification Search
   USPC ................................................ 376/157–166
   See application file for complete search history.

(56) References Cited

U.S. PATENT DOCUMENTS

| | | | |
|---|---|---|---|
| 4,810,876 A | 3/1989 | Wraight et al. | |
| 5,021,653 A | 6/1991 | Roscoe et al. | |
| 5,539,788 A * | 7/1996 | Ruddy | G01N 23/222 376/160 |
| 6,571,619 B2 | 6/2003 | Herron et al. | |
| 7,366,615 B2 * | 4/2008 | Herron | G01V 5/125 702/6 |
| 8,024,122 B2 * | 9/2011 | LeCompte | G01V 5/101 702/8 |
| 8,101,907 B2 * | 1/2012 | Jacobi | G01V 5/12 250/256 |
| 8,963,073 B2 | 2/2015 | Grau et al. | |
| 9,086,500 B2 * | 7/2015 | Ansari | G01V 5/101 |
| 9,541,668 B2 * | 1/2017 | Grau | G01V 5/10 |
| 9,575,208 B2 | 2/2017 | Grau et al. | |
| 9,897,719 B2 * | 2/2018 | Stephenson | G01V 5/101 |
| 10,036,828 B2 * | 7/2018 | Jain | G01V 5/101 |
| 10,101,493 B2 * | 10/2018 | Xu | G01V 5/101 |
| 10,215,881 B2 | 2/2019 | Zhou et al. | |
| 10,317,568 B2 * | 6/2019 | Mauborgne | G01V 5/06 |
| 10,429,540 B2 * | 10/2019 | Grau | G01V 5/101 |
| 10,466,384 B2 * | 11/2019 | McKeon | G01V 5/101 |
| 10,473,802 B2 * | 11/2019 | McCleskey | G01T 1/36 |
| 10,520,641 B2 * | 12/2019 | Inanc | G01V 5/105 |
| 10,539,703 B2 * | 1/2020 | Donadille | E21B 49/00 |
| 10,585,209 B2 * | 3/2020 | Inanc | G01V 5/102 |
| 10,591,630 B2 * | 3/2020 | Berheide | G01V 5/101 |
| 10,725,201 B2 * | 7/2020 | Mendez | G01N 33/24 |
| 10,983,246 B2 * | 4/2021 | Mosse | G01V 99/005 |
| 11,073,635 B2 * | 7/2021 | Zhou | G01V 5/104 |
| 11,079,513 B2 * | 8/2021 | Banzarov | G01V 5/102 |
| 11,243,328 B2 * | 2/2022 | Pemper | G01V 5/101 |
| 11,397,277 B2 * | 7/2022 | Chin | G01N 23/222 |
| 11,675,103 B2 * | 6/2023 | Haranger | G01V 5/06 250/269.6 |
| 11,815,646 B2 * | 11/2023 | Mauborgne | G01V 5/101 |
| 11,841,335 B2 * | 12/2023 | Wakabayashi | G01N 23/222 |
| 2008/0023629 A1 | 1/2008 | Herron et al. | |
| 2012/0197529 A1 | 8/2012 | Stephenson et al. | |
| 2016/0327680 A1 | 6/2016 | Jain | |
| 2017/0176624 A1 | 6/2017 | Donadille et al. | |
| 2017/0176639 A1 | 6/2017 | Mosse et al. | |

OTHER PUBLICATIONS

Herron, S. L. et al., "Application of Nuclear Spectroscopy Logs to the Derivation of Formation Matrix Density", Transactions of the SPWLA 41st Annual Logging Symposium, Jun. 4-7, Dallas, Texas, USA., Paper JJ, 2000, 12 pages.

Herron, S. L. et al., "Wireline Source-Rock Evaluation in the Paris Basin", AAPG Studies in Geology #30, Deposition of Organic Facies (AAPG, Tulsa), 1990, p. 57-71.

Radtke, R. J. et al., "A New Capture and Inelastic Spectroscopy Tool Takes Geochemical Logging to the Next Level", presented at the 53rd Annual Logging Symposium, Cartagena, Colombia, 2012, 16 pages.

International Search Report and Written Opinion of International Patent Application No. PCT/US2019/035231 dated Sep. 20, 2019, 12 pages.

International Preliminary Report on Patentability of International Patent Application No. PCT/US2019/035231 dated Dec. 17, 2020, 9 pages.

* cited by examiner

MEASURING SPECTRAL CONTRIBUTIONS OF ELEMENTS IN REGIONS IN AND ABOUT A BOREHOLE USING A BOREHOLE SPECTROSCOPY TOOL

CROSS-REFERENCE TO RELATED APPLICATIONS

This application claims the benefit of priority under 35 U.S.C. 119(e) to U.S. Provisional Patent Application No. 62/680,024, filed Jun. 4, 2018, the entire contents of which are incorporated herein by reference.

FIELD

The subject disclosure relates to formation evaluation. More particularly, the subject disclosure relates to methods of using neutron-induced gamma-ray spectroscopy in a wellbore environment to measure the concentrations of one or more elements in a region in or about the wellbore.

BACKGROUND

Spectroscopy tools are being used in wellbores to find relative concentrations of various elements in a formation from which lithology and matrix properties can be ascertained. For example, the ECS® elemental capture spectroscopy sonde uses a standard 16-Ci ($59.2 \times 10^{10}$ Bq) americium beryllium (AmBe) neutron source and a large bismuth germanate (BGO) detector to measure relative elemental yields based on neutron-induced capture gamma ray spectroscopy. The primary elements measured in both open and cased holes are for the formation elements silicon (Si), iron (Fe), calcium (Ca), sulfur (S), titanium (Ti), gadolinium (Gd), chlorine (Cl), barium (Ba), and hydrogen (H). Wellsite processing uses a 254-channel gamma ray energy spectrum to produce dry-weight elements, lithology, and matrix properties. A deconvolution of the composite gamma ray energy spectrum is then conducted by using a set of elemental standards to produce relative elemental yields. The relative yields are then converted to dry-weight elemental concentration logs for the elements Si, Fe, Ca, S, Ti, and Gd using an oxides closure method. Matrix properties and quantitative dry-weight lithologies are then calculated from the dry-weight elemental fractions using empirical relationships derived from an extensive core chemistry and mineralogy database.

Spectroscopy tools, and the answer-products generated therefrom have proven extremely valuable in assessing the mineralogy and lithology of a formation. At the same time, the elemental yields that are calculated from the measured gamma ray spectrum can be influenced by elements found in the wellbore, casing, and cement-filled annulus.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

In an embodiment of the subject disclosure, gamma-ray scattering signals detected by a tool in the borehole are used in conjunction with two or more spectral standards for an element located in defined regions in order to quantify the concentration of that element in a specific defined region.

For example, in one embodiment, the borehole is considered a region and the formation is considered another region. For a given element, separate borehole and formation standards are generated for the element, and a "difference standard" representing a channel-by-channel amplitude difference between the standards is computed. The spectral contribution from the difference standard of an element may be linked to the borehole or the formation contribution of that element. In one embodiment, a formation yield of the element is generated.

In one embodiment, a difference standard is generated for chlorine. In another embodiment, a difference standard is generated for oxygen. In other embodiments, one or more difference standards may be generated for one or more other elements. In embodiments, the difference standard is utilized to generate formation elemental yields that are different than what would otherwise be generated without utilizing the difference standard; i.e., corrected yields.

The one or more corrected formation yields may further be used to generate additional answer products. By way of example, the weight fraction of chlorine in the formation relative to the weight of the rock matrix may be calculated as a function of the corrected formation yield. The formation chlorine concentration may be associated with pore fluid and be used to compute pore water volume or to compute water chlorine concentration. In one embodiment, the corrected formation chlorine concentration may also be used in conjunction with measurements made from other tools such as a dielectric measurement tool to derive a pore water salt chlorine index. In one embodiment, the corrected formation chlorine concentration may be used in conjunction with tools providing dielectric dispersion information, total organic carbon, and a porosity measurement to simultaneously estimate water volume, water salinity, and hydrocarbon density in conventional reservoirs having high salinity.

Other aspects and advantages will be apparent from the following description and the appended claims.

BRIEF DESCRIPTION OF DRAWINGS

The subject disclosure is further described in the detailed description which follows, in reference to the noted plurality of drawings by way of non-limiting examples of the subject disclosure, in which like reference numerals represent similar parts throughout the several views of the drawings, and wherein.

DETAILED DESCRIPTION

The particulars shown herein are by way of example and for purposes of illustrative discussion of the examples of the subject disclosure only and are presented in the cause of providing what is believed to be the most useful and readily understood description of the principles and conceptual aspects of the subject disclosure. In this regard, no attempt is made to show structural details in more detail than is necessary, the description taken with the drawings making apparent to those skilled in the art how the several forms of the subject disclosure may be embodied in practice. Furthermore, like reference numbers and designations in the various drawings indicate like elements.

This disclosure is conveniently described in two parts: (1) identifying the spectral yield of formation chlorine by decomposing the total measured chlorine yield into formation and borehole components; and (2) relating the formation chlorine yield to water volume and water chlorine concentration or salinity. The method of the first part could be applied to other elements as well, as will be discussed.

Almost any neutron-induced gamma-ray spectroscopy measurement of chlorine in a typical wellbore environment will represent a sum of contributions from chlorine in the borehole and in the formation. The contribution from chlorine in the wellbore is typically significant. This borehole component should be accurately removed to provide particularly useful results.

The technique taught here to separate borehole and formation chlorine is driven by the difference in gamma-ray scattering that occurs for detected gamma rays originating from the borehole as opposed to those originating from the formation. In particular, gamma rays originating from the borehole will undergo less scattering prior to detection for two reasons: (1) the average scattering length prior to detection will be less, and (2) the density of the borehole fluid will be less than the bulk density of the formation. A technique to compensate for the unwanted effects of variations in gamma-ray scattering, in particular for cased wellbores, is taught in U.S. Pat. No. 9,575,208 to Grau et al., entitled "Geological Constituent Estimation Using Calculated Spectra Relationships, which is hereby incorporated by reference herein in its entirety. Another technique to compensate for unwanted scattering variations is taught in U.S. Pat. No. 8,963,073 to Grau et al., entitled "Systems and Methods for Environmental Corrections in Nuclear Spectroscopy Using Multiple Standards and Different Spatial Regions", which is hereby incorporated by reference herein in its entirety. This disclosure provides for measuring the effects of variations in gamma-ray scattering and uses that result to extract useful information about the measurement environment.

Figure 1:
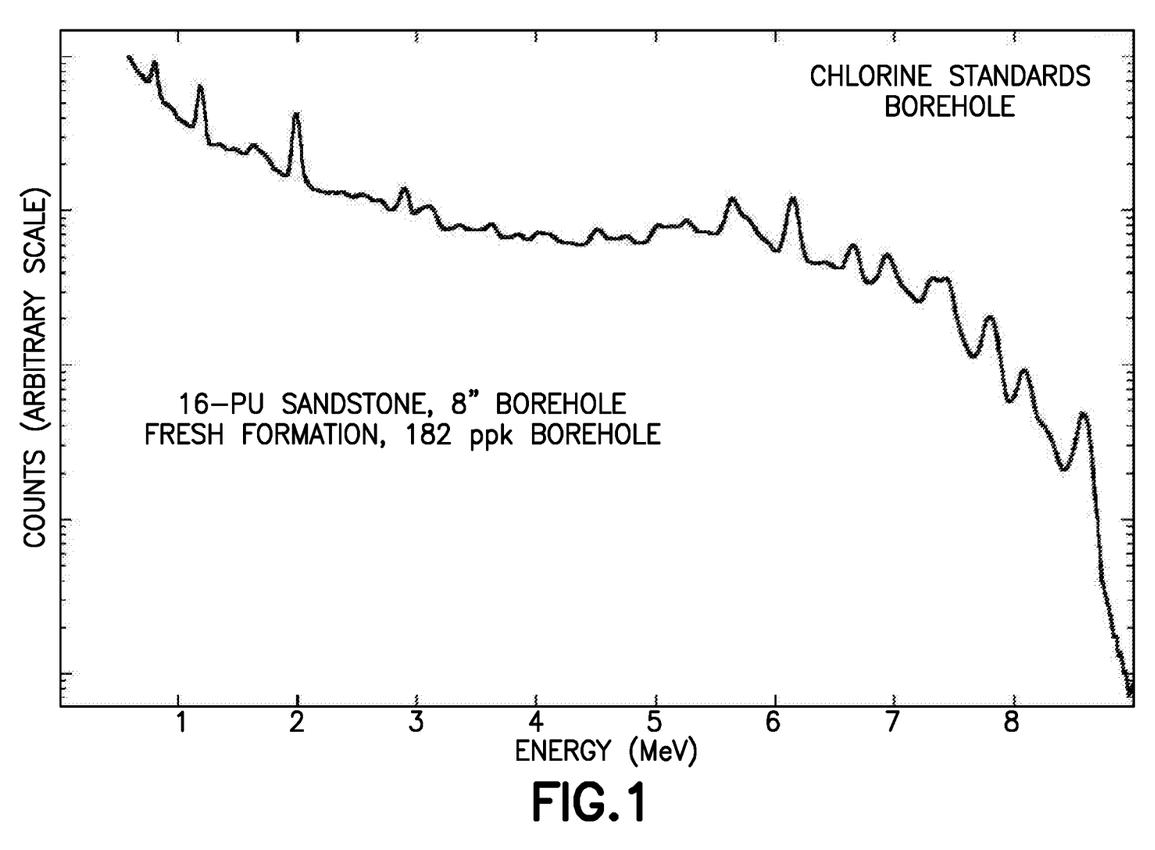
FIG. 1 is a plot of a borehole chlorine standard showing counts as a function of energy.

FIG. 1 shows a measure of the detected spectrum from chlorine originating from the borehole, based on a 16-p.u. fresh-water sandstone measurement with 182-ppk saltwater in an 8-inch borehole. This borehole chlorine spectrum was produced by acquiring a raw measurement in the above environment and by subtracting the nominal hydrogen standard, the hydrogen difference standard, the borehole liner standard, and the silicon standard.

Figure 2:
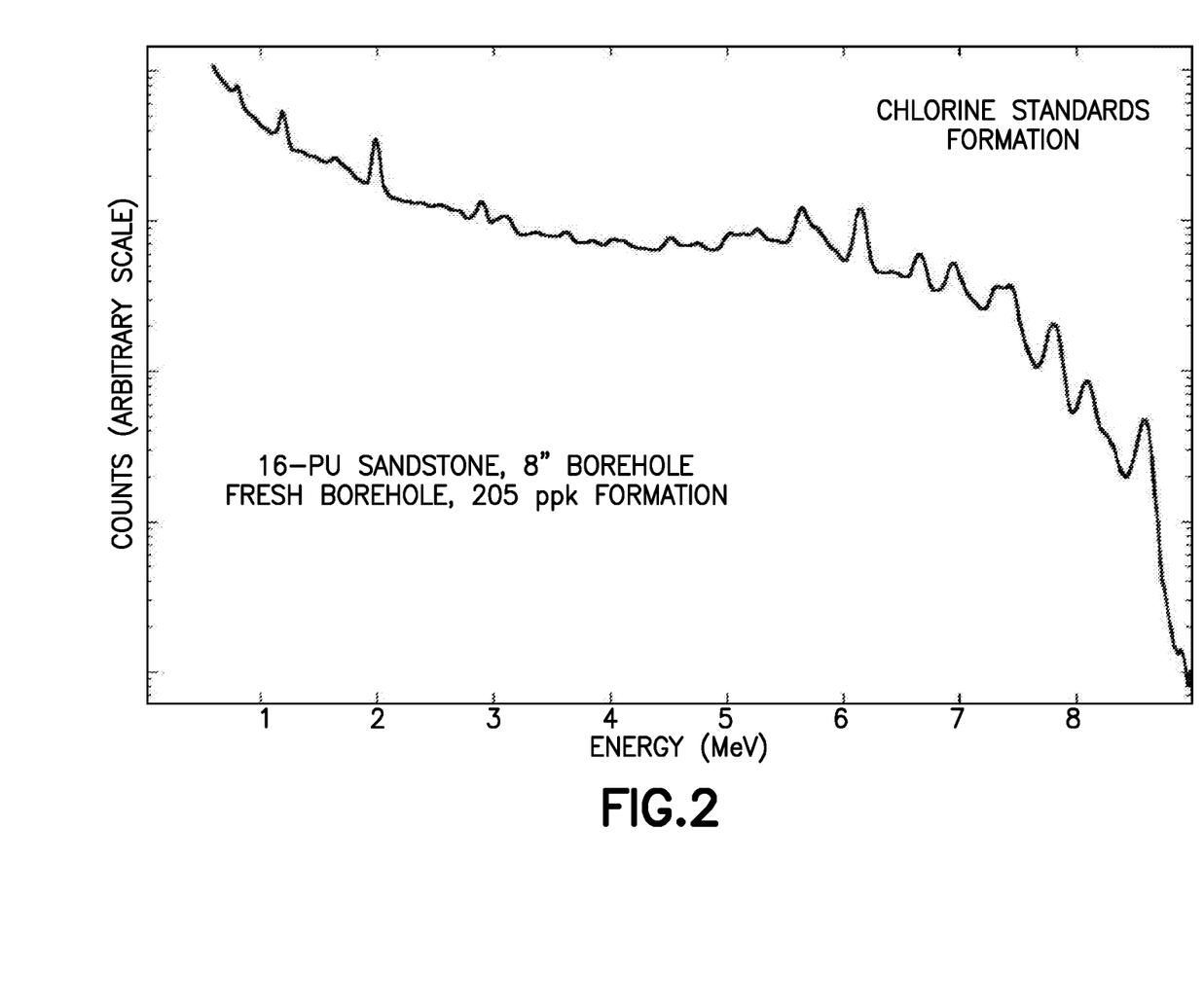
FIG. 2 is a plot of a formation chlorine standard showing counts as a function of energy.

FIG. 2 shows a measure of the detected spectrum from chlorine originating from the formation, based on a 16-p.u. sandstone measurement with 205-ppk saltwater in the porosity and fresh water in the 8-inch borehole. This formation chlorine spectrum was produced by acquiring a raw measurement in the above environment and by subtracting the nominal hydrogen standard, a hydrogen difference standard, the borehole liner, and the silicon standard. As compared with the borehole spectrum in FIG. 1, there is notably more scattering when the chlorine gamma rays originate from the formation.

From these measurements, a formation chlorine standard and a borehole chlorine standard are provided, but it should be appreciated that by including them both in the spectral analysis it cannot be assumed that the spectral yield from the formation chlorine standard would accurately quantify the chlorine contribution from the formation, and that the spectral yield from the borehole chlorine standard would accurately quantify the chlorine contribution from the borehole. This would be true only in the exact environments in which those standards were measured. The borehole-vs-formation scattering effects are quite environmentally dependent, with sensitivity to a list of properties including but not limited to the borehole size, the borehole fluid composition, the formation porosity, the composition of the formation rock and fluids, and the presence of possible casings and cement. Therefore, methods for quantifying the chlorine contribution from the formation are needed.

Figure 3:
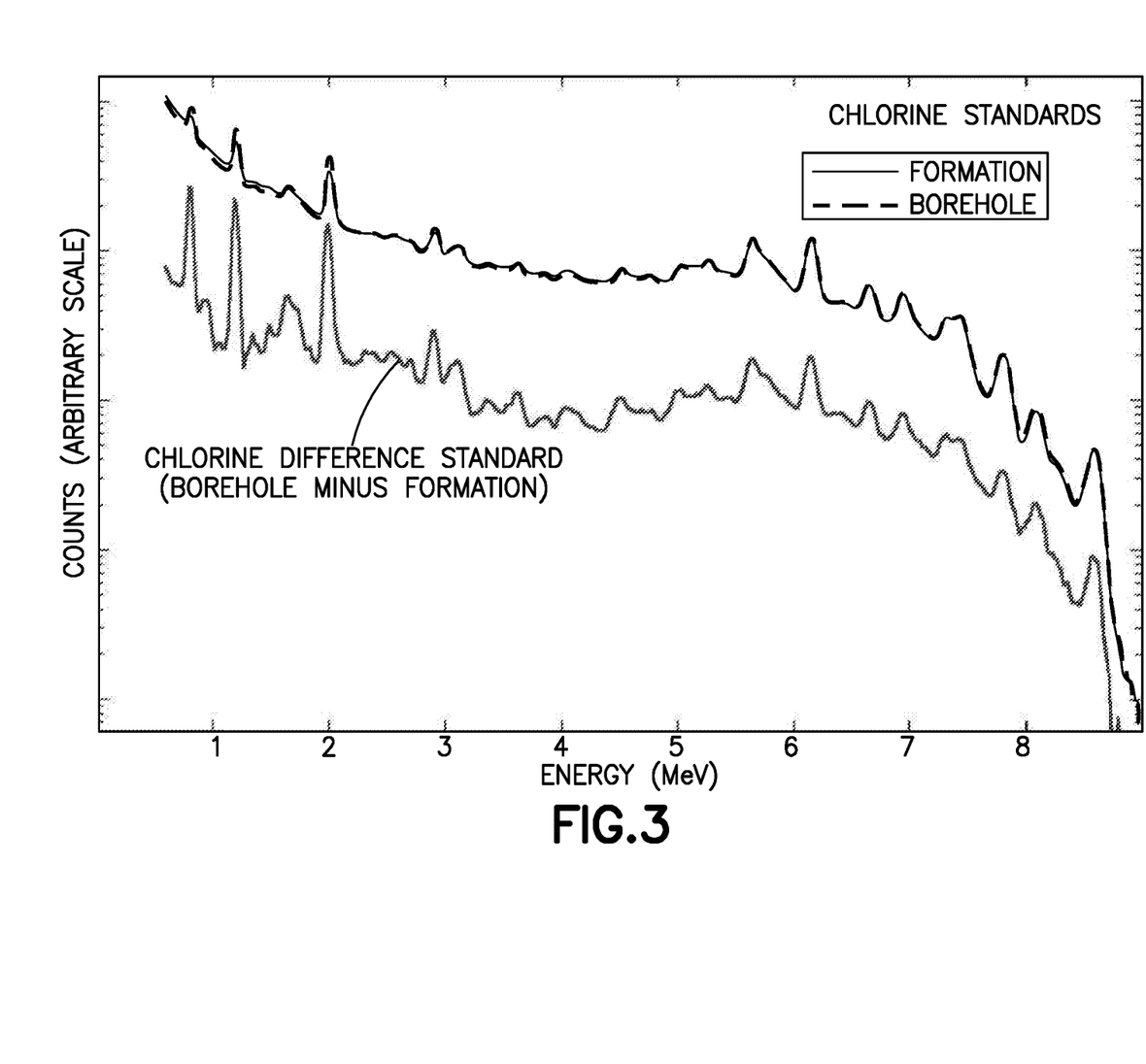
FIG. 3 is a plot showing the results of FIGS. 1 and 2 overlaid, and a chlorine difference (borehole minus formation) standard.

According to one aspect, from these two spectra for chlorine, a chlorine difference standard may be computed from the two spectra for chlorine, the chlorine difference standard representing a channel-by-channel amplitude difference between the two standards, as shown in FIG. 3. This standard shape is meant to reflect the difference in gamma-ray scattering between chlorine emitted from the borehole and chlorine emitted from the formation. Purely for convenience of the spectral analysis, the sense of the difference was chosen to be borehole-minus-formation. The subtraction factor is quite arbitrary, but the stripping (subtraction) goal here is to enhance the three prominent low-energy chlorine peaks without introducing an excessive number of channels with negative values. The extra gamma ray scattering in the formation spectrum manifests as a higher continuum background and a lower intensity of the full-energy peaks, both evident at the low-energy end of the spectrum. The nominal chlorine standard is then chosen, again somewhat arbitrarily, to be from the formation chlorine measurement. The assumption then is that the total chlorine contribution from any formation and borehole scattering environment can be reproduced with an appropriate contribution from each of these two standards. Those skilled in the art of spectral analysis will perceive that this example is not the only combination of formation and borehole chlorine spectra that can reconstruct the total chlorine signal in a downhole environment, and that other definitions of the difference standard and nominal chlorine standard could also be viable and used.

Figure 4:
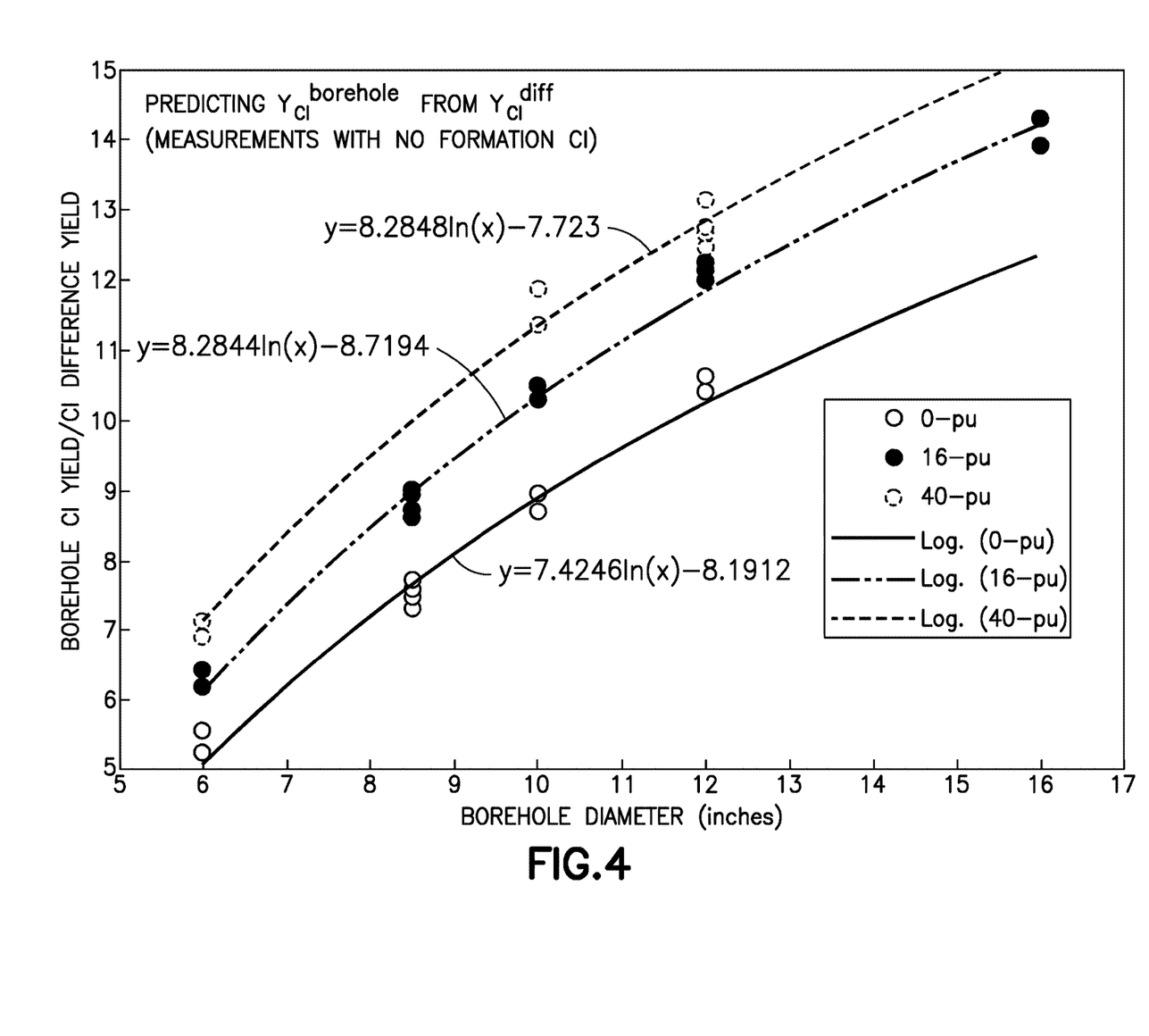
FIG. 4 is a plot showing a borehole chlorine yield divided by a chlorine difference yield as a function of borehole diameter for formations of different porosities.

The spectral contribution from the chlorine difference standard ($Y_{Cl}^{diff}$) is linked to the borehole chlorine contribution ($Y_{Cl}^{borehole}$) but in a fairly complicated way, depending on borehole size, formation density and formation porosity, as can be seen in FIG. 4. The average scattering length for gamma rays originating in the borehole increases with borehole size, which moves the shape of the borehole Cl spectrum toward that of the formation Cl spectrum, thus decreasing $Y_{Cl}^{diff}$. At the same time, a decrease in formation porosity allows neutrons to travel further through the formation and allows neutron captures to occur in the borehole closer to the detector, which reduces the average scattering length, moving the borehole Cl spectrum away from the formation Cl spectrum, thus increasing $Y_{Cl}^{diff}$. In principle, the difference yield $Y_{Cl}^{diff}$ for a given chlorine concentration is affected by any properties that affect the migration length of the neutrons and the scattering length of the resulting gamma rays. As indicated above, this list would include but is not limited to borehole size, borehole fluid or gas composition, formation porosity or hydrogen index, formation fluid or gas composition, formation lithology including mineralogy and/or shale content, and the presence of possible casings and cement.

It would be difficult to analytically calculate the environmental dependence of $Y_{Cl}^{borehole}$ on $Y_{Cl}^{diff}$ from physical principles. Indeed, the relation is intimately related to the arbitrary subtraction factor used to generate the chlorine difference standard and to the exact environments from which the formation and borehole standard spectra were measured. An empirical calibration can also be extracted from detailed numerical modeling of the measurement in various environments where the modeling reproduces the effects of neutron transport and gamma-ray scattering. For these measurements or simulations, all the parameters needed to calculate the expected true formation chlorine yield are known:

$$Y_{Cl}^{form}(\text{expected}) = \frac{\emptyset \cdot \rho_{water} \cdot S_{Cl} \cdot C_{Cl}}{FY2W \cdot \rho_{ma} \cdot (1 - \emptyset)} \quad (1)$$

where, $\emptyset$ is the formation porosity, $\rho_{water}$ and $C_{Cl}$ are the density and chlorine concentration of the water filling the formation pores, $\rho_{ma}$ is the density of the dry formation matrix, $S_{Cl}$ is the weight-fraction sensitivity for detecting chlorine-capture gamma rays, and FY2 W is the yields-to-weights transformation factor, which can be determined via closure normalization as taught in Grau, J. A., et al., "A Geochemical Model for Gamma Ray Spectroscopy Logging Measurements", *Nuclear* Geophysics, Vol. 3, No. 4 pp. 351-359 (1989), and in U.S. Pat. No. 4,810,876 to Wraight, et al., entitled "Logging Apparatus and Method for determining Absolute Elemental concentrations of Subsurface Formations". FY2 W is easily calculated from these simple quartz or calcite formations from the silicon or calcium yields. From this equation, the expected borehole chlorine yield should be:

$$Y_{Cl}^{borehole}(\text{expected}) = Y_{Cl}^{total} - Y_{Cl}^{form}(\text{expected}), \quad (2), \text{ where}$$

$$Y_{Cl}^{total} = Y_{Cl}^{nominal} + Y_{Cl}^{diff}. \quad (3)$$

The environmental dependence can now be calibrated by optimizing a correction function $f(bhd, \emptyset)$ with inputs for borehole diameter bhd and porosity $\emptyset$ such that:

$$Y_{Cl}^{borehold}(\text{expected}) = Y_{Cl}^{diff} \cdot f(bhd, \emptyset) \quad (4)$$

Figure 5:
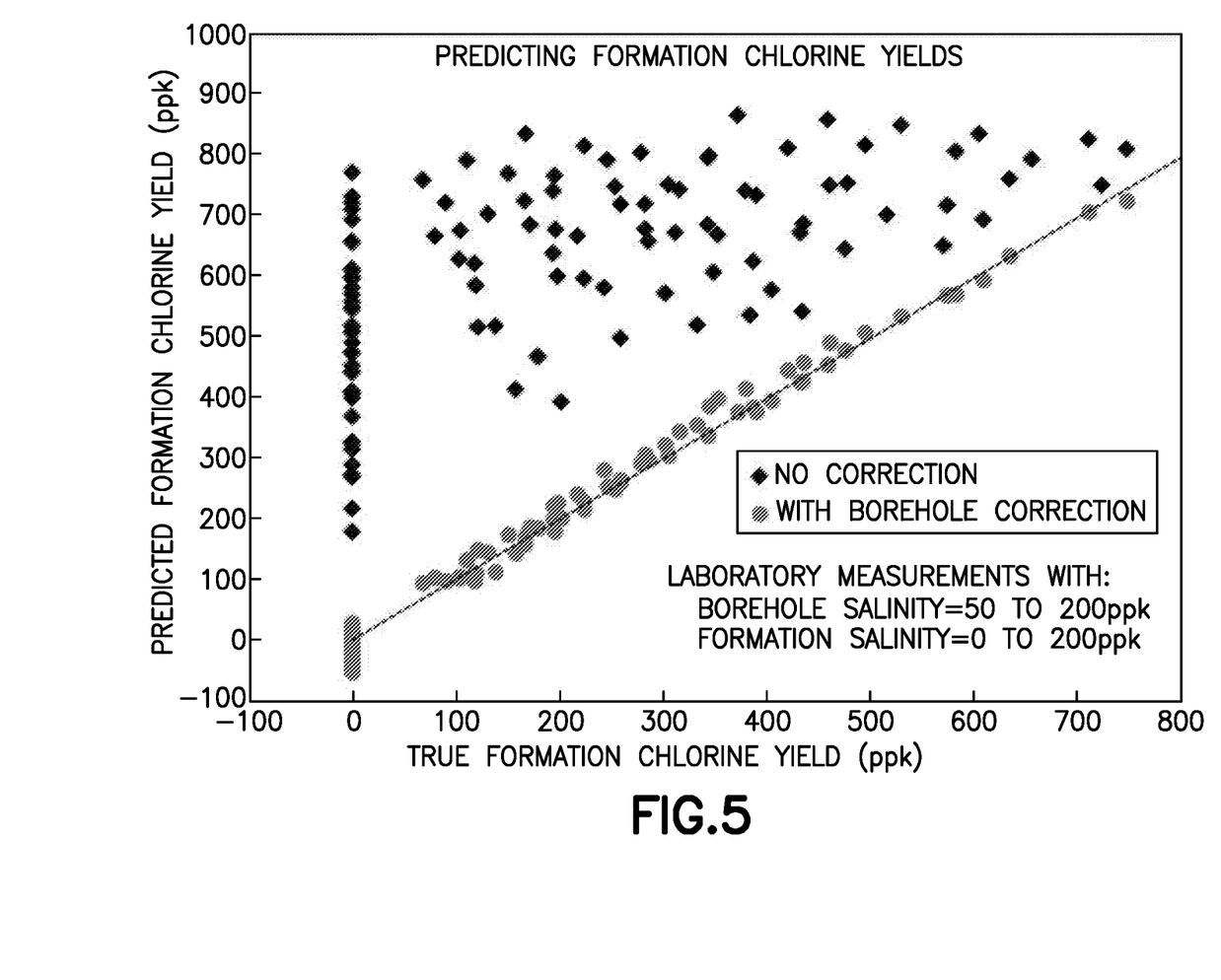
FIG. 5 is a plot showing predicted formation chlorine yields versus true formation chlorine yields with and without borehole chlorine correction.

The result of this optimization is shown in FIG. 5, which is plotted in terms of the bottom-line prediction of the desired formation chlorine yield. The diamond points are the total chlorine yield with no borehole correction, while the circles show the predicted formation chlorine yield after applying the correction for the borehole contribution. Clearly the necessary correction is quite large, and the predicted formation chlorine yield agrees well with the expected values.

Figure 6:
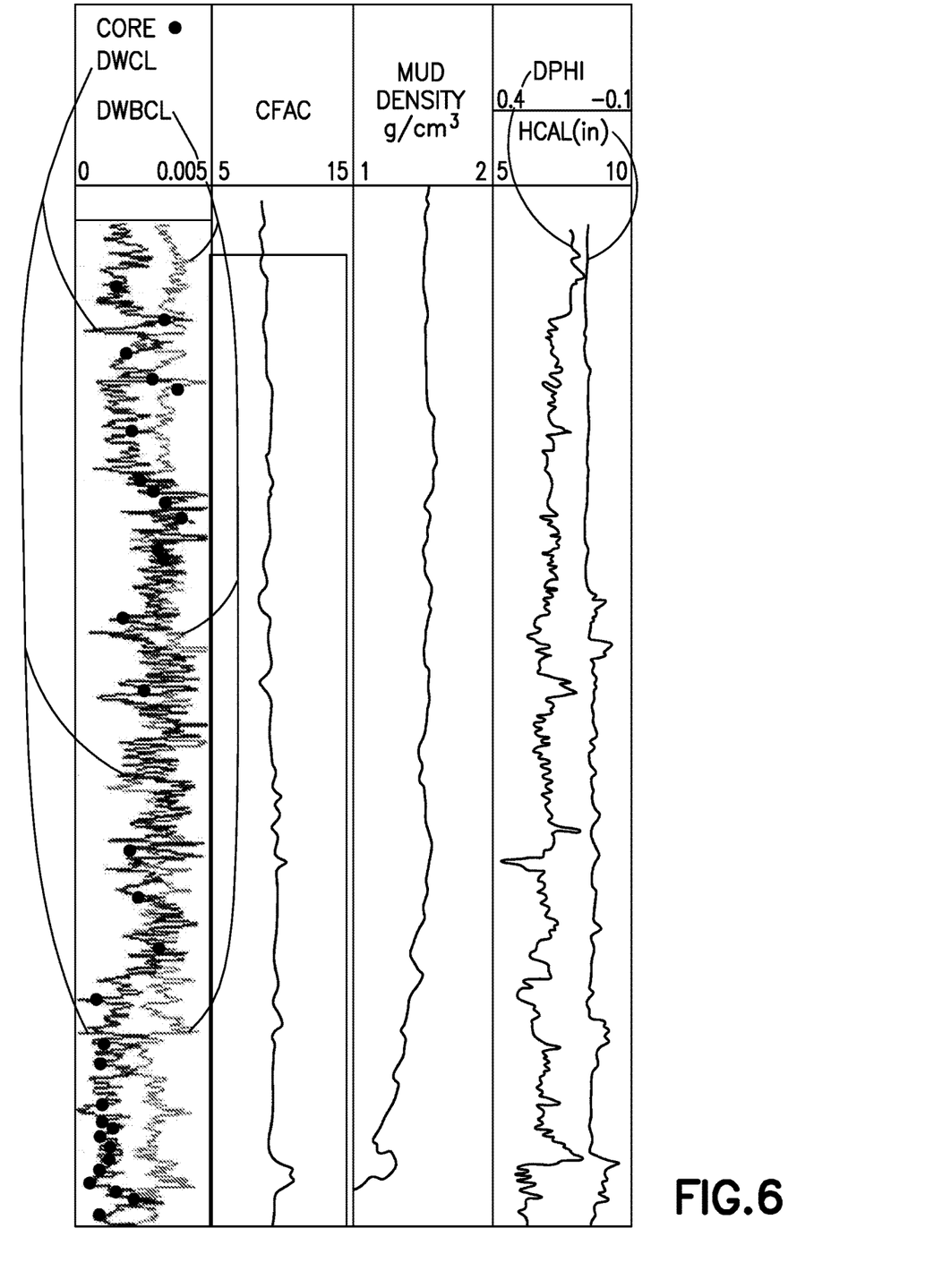
FIG. 6 is a log comparing formation chlorine dry weight fractions as derived from the methods of the disclosure and formation chlorine dry weight fractions taken from core measurements.

FIG. 6 shows an example of this method applied to a well. In FIG. 6, the first (leftmost) track shows a representative log (dark line) of the formation chlorine dry weight fractions DWCL as determined according to this disclosure. This log may be compared with the chlorine concentration measured in core samples (in solid circles) using a laboratory INAA technique. A representative log of the borehole chlorine DWBCL is also displayed (light line) in the same track. The second track displays representative correction factors CFAC, representing the depth-dependent values of the empirical function $f(bad, \emptyset)$ above. The third track shows a representative log of the mud density derived from borehole pressure gradient, and the fourth tracks show a representative caliper (borehole diameter) HCAL and the matrix-corrected density porosity DPHI. Note that the representative examples were acquired in oil-based mud with a high fraction of salt-saturated water. The borehole diameters range from about 6.125 to about 8.5 inches. The relative amount of chlorine from the representative borehole is higher than the amount of chlorine from the representative formation in the 8.5-inch borehole cases. The match between core and log-derived measurements is shown as excellent.

The above technique of separating borehole and formation chlorine can be viewed as an example of a more general method of distinguishing the spectral contributions of any element from multiple regions based on differences in gamma-ray scattering. For example, this method may be applied to other elements such as Ca, Si, C, O, Fe, and others. The neutron-induced reactions that give rise to the gamma rays can also include inelastic reactions as well as thermal neutron capture. In addition, the regions associated with the nominal and difference standards could include any of the borehole, a steel casing, a cement annulus, the formation, a tool background, or other regions. In principle, the method could even be extended to more than two regions, with a spectral standard or difference standard associated with the characteristic gamma-ray scattering for each region.

Figure 7A:
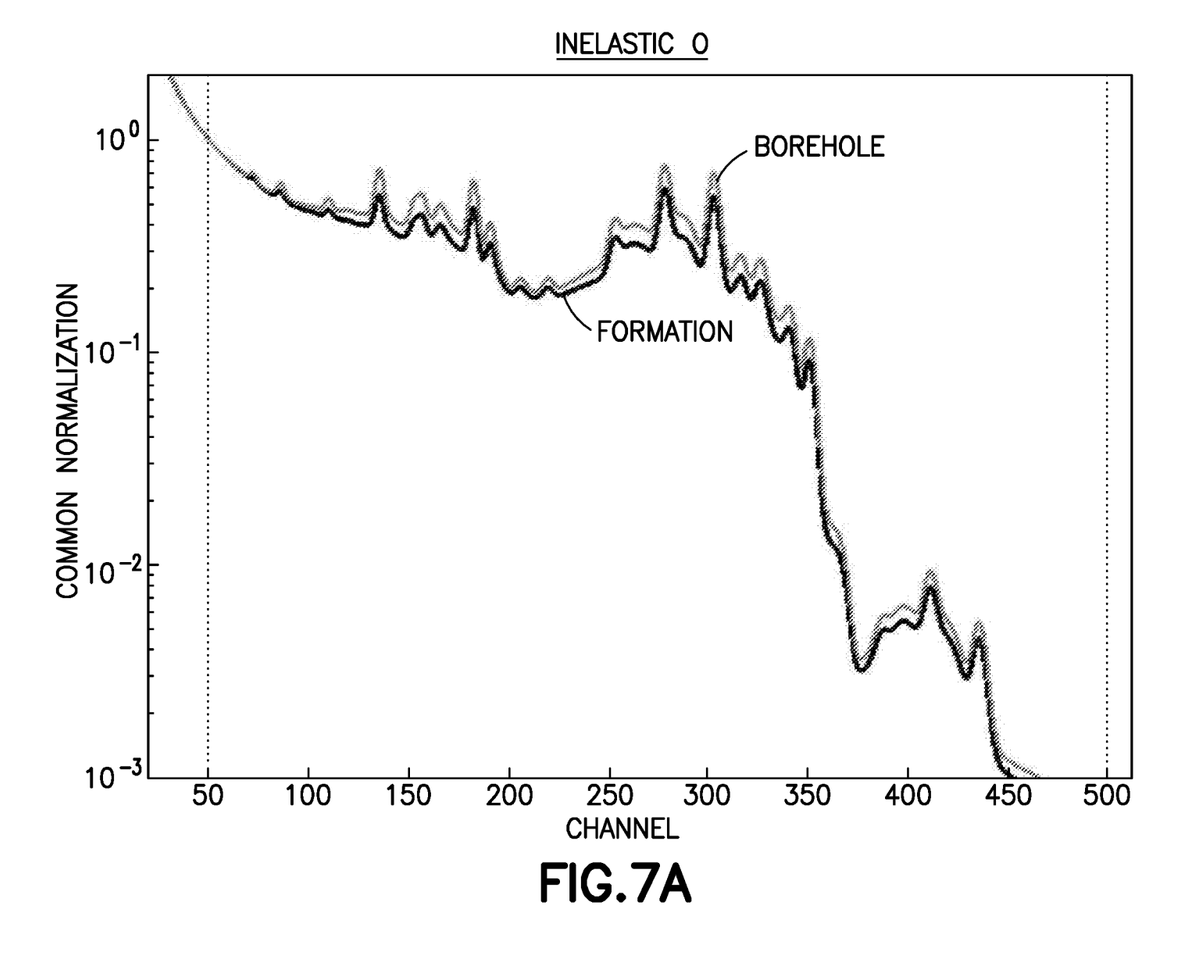
FIG. 7a is a plot of formation and borehole inelastic oxygen standards showing counts as a function of energy (channel)
Figure 7B:
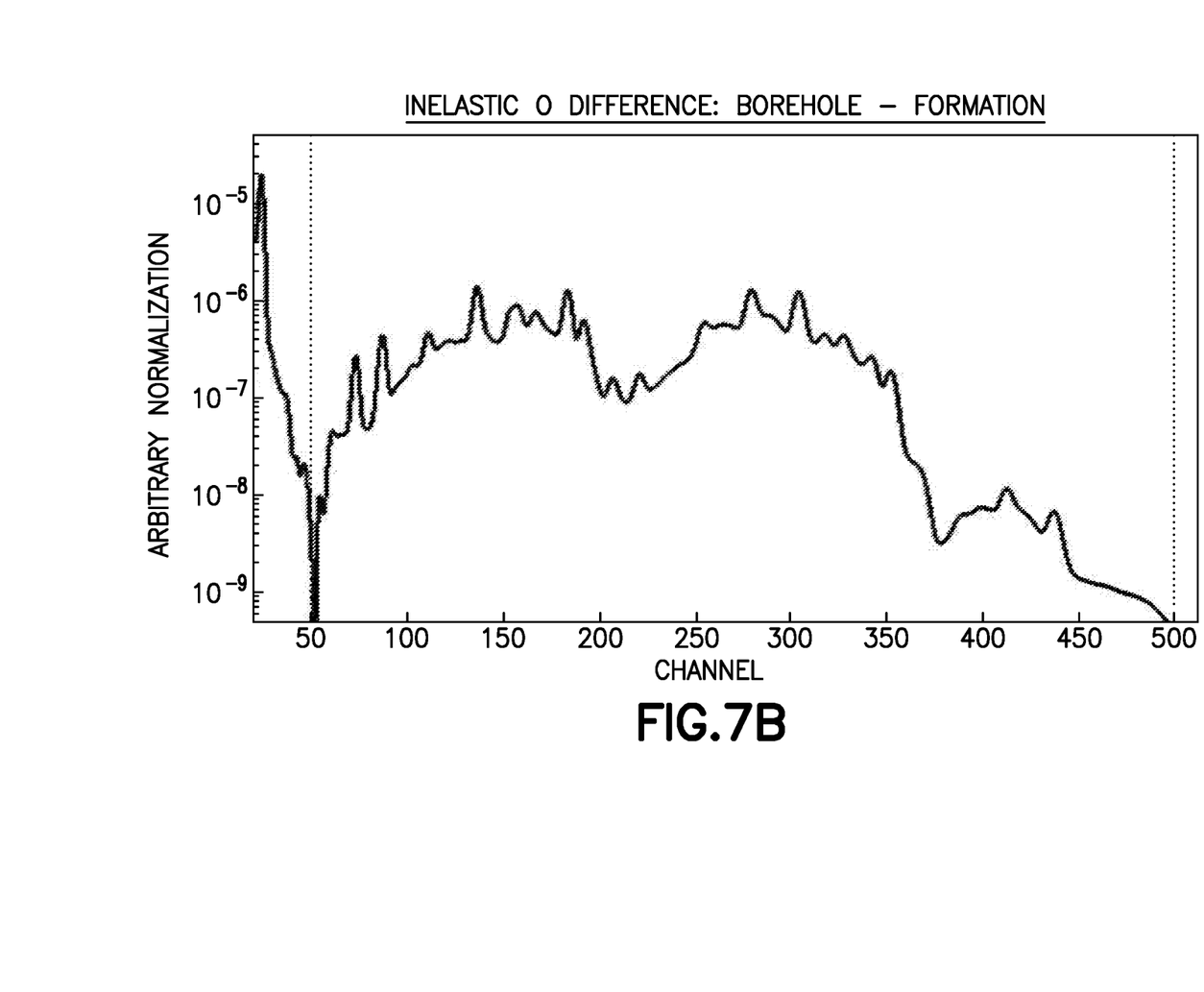
FIG. 7b is a plot showing an inelastic oxygen difference (borehole minus formation) standard.

For example, FIG. 7a shows the detected response to oxygen from inelastic neutron-gamma spectroscopy, with separate spectra for oxygen gamma rays originating from the borehole or from the formation. These spectra are derived from computational modeling, as taught in previously incorporated U.S. Pat. No. 9,575,208 for a 16-p.u. sandstone with a fresh-water-filled 8-inch borehole and fresh-water in the pore-space. Just as in the example of Cl, the two oxygen standards can be combined to define a difference standard, as shown in FIG. 7b. This oxygen difference standard is defined with a borehole-minus-formation sense, illustrating that the reduced gamma ray scattering in the borehole spectrum is manifested with higher intensity in the full-energy peaks and with reduced down-scattering to lower energies.

Continuing this example, a spectral analysis can be performed including a nominal formation oxygen standard and an oxygen difference standard to represent the variation in gamma-ray scattering associated with gamma rays from the borehole versus from the formation. In analogy to the chlorine example, this new spectral analysis will produce yields associated with these oxygen standards, $Y_O^{form}$ and $Y_O^{diff}$ respectively. As before, these yields cannot be used directly to represent the spectral contributions of the formation and borehole oxygen, unless the measurement environment is the same as the one from which the standards were derived. For the oxygen inelastic signal, the region-dependent scattering effects are sensitive to any properties that affect the slowing-down length of the neutrons and the scattering length of the resulting gamma rays. Once again, this list of properties would include but is not limited to the borehole size, borehole fluid or gas composition or hydrogen index, formation porosity or hydrogen index, formation fluid or gas composition, formation lithology including mineralogy and/or shale content, and the presence of possible casings and cement. However, an empirical calibration can be used to relate the observed oxygen yields $Y_O^{form}$ and $Y_O^{diff}$ to the actual spectral contributions of the formation and borehole regions in a new measurement environment.

Like the chlorine example, this correction for the borehole oxygen contribution may take the form of $$Y_O^{borehole}(\text{expected}) = Y_O^{diff} \cdot f(bhd, \emptyset) \quad (5)$$

where the function $f(bhd, \emptyset)$ is an empirical function of borehole diameter and formation porosity. Based on the discussion above, it will be clear that correction functions could be formed based on other environmental parameters as previously listed.

By deriving appropriate spectral standards and correction functions, the total oxygen signal could be corrected to isolate the oxygen signal from specific regions, including the formation, borehole, or an annulus within or outside a casing. In one application, the total oxygen signal could be corrected to isolate the oxygen signal from an annulus region, and the annular oxygen yield could be used to distinguish the presence of cement, water, or other materials behind casing. Similar applications could be developed to distinguish the signal of Ca or Si from different regions including the formation, borehole, or an annulus within or outside a casing.

A similar application could be developed to distinguish the signal of Fe from different regions including the formation, a steel casing, or a tool background.

As applied to carbon, a similar application could be used to distinguish formation carbon from borehole carbon that arises from sources such as oil-based mud.

Many applications are made possible using the formation chlorine yield that are derived above. In the following sections, it is shown how the formation chlorine yield can be related to formation water volume and/or NaCl-equivalent salinity, and how these values can be computed in different combinations and with the option of including additional measurements.

The weight fraction of chlorine in the formation, relative to the weight of the rock matrix, can be calculated from the equation below:

$$DW_{Cl} = FY2W \cdot \frac{Y_{Cl}^{form}}{S_{Cl}} \quad (6)$$

Here $Y_{Cl}^{form}$ is the spectral yield for formation chlorine, S u is the weight-fraction sensitivity for detecting chlorine-capture gamma rays, and FY2 W is the yields-to-weights transformation factor, which can be determined via closure normalization as taught in previously incorporated U.S. Pat. No. 4,810,876 and in the previously referenced article of Grau, J. A. et. al. (1989).

Excluding halite (NaCl), common minerals do not contain chlorine, and halite is readily distinguished with other logs. Therefore, the formation chlorine concentration can be associated with the pore fluid and can be used to compute pore water volume. Alternatively, the formation chlorine concentration can be used to compute water chlorine concentration (i.e. the water salinity if the salt type is known, or alternatively NaCl-equivalent salinity), as will be shown in another aspect further below. In a first example, the pore water volume is computed.

In the following paragraphs, water chlorine concentration, water salinity (NaCl equivalent) and water conductivity are used as if those properties were uniquely related. To pass from chlorine concentration to NaCl-equivalent salinity to conductivity requires the knowledge of the type of salts in the water, in addition to temperature and pressure. Each time water salinity or water conductivity is used in the paragraphs below, it must be understood that the external knowledge of salt type is required.

Knowing the dry weight fraction of chlorine, the dry weight fraction of the pore water can be computed as:

$$DW_{water} = \frac{DW_{Cl}}{C_{Cl}} \quad (6a)$$

Here $C_{Cl}$ is the weight fraction of chlorine in the pore water, derived from external knowledge of the composition of the water. In one aspect, an attempt is made to measure $C_{Cl}$, but for now, an assumption is made that it is known.

Two workflows can be used to derive water volume from pore water dry weight fraction. The choice of the workflow depends on the available input information.

In a first workflow, the total pore volume (or total porosity $\phi_T$) is known, as is the dry matrix grain density ($\rho_{ma}$). By definition of the dry weight fraction, the water volume is directly written as $$\phi_{water} = \frac{DW_{water}(1 - \phi_T)\rho_{ma}}{\rho_{water}}. \quad (7)$$

There exist many methods to estimate total porosity, and the grain density can be estimated substantially as described in Herron, S. L., et al. "Application of nuclear spectroscopy logs to the derivation of formation matrix density", *Transactions of the SPWLA 41st Annual Logging Symposium*, 4-7 June, Dallas, TX Paper JJ (2000) and in U.S. Pat. No. 6,571,619 to Herron et al., which is hereby incorporated by reference herein in its entirety. Note that in the equation above, the density of the water ($\rho_{water}$) depends on the user-input chlorine salinity ($C_{Cl}$) and type of salts, as described below.

In the second workflow, Total Organic Carbon dry weight fraction (TOC) and formation bulk density ($\rho_b$) are known. It is not necessary for the total pore volume to be known. The weight fraction of hydrocarbon can be computed as:

$$DW_{HC} = \frac{TOC}{X_C} \quad (8)$$

Here TOC is the dry weight fraction of organic carbon, which can be measured as described in Herron, S. L., et al., "Wireline source rock evaluation in the Paris Basin", *AAPG Studies in Geology #30, Deposition of Organic Facies* (AAPG, Tulsa, p 57-71 (1990), and Radtke, et al., "A New Capture and Inelastic Spectroscopy Tool Takes Geochemical Logging to the Next Level", *Transactions of the SPWLA 53rd d Annual Logging Symposium*, Cartagena, Columbia (2012), and $X_C$ is the weight fraction of carbon in the hydrocarbon, which is usually fairly well known from local knowledge.

Then the weight fraction of pore water relative to the total weight of the formation, known as the wet weight fraction, can be calculated as:

$$WW_{water} = \frac{DW_{water}}{1 + DW_{water} + DW_{HC}}, \qquad (9)$$

and then the desired volume fraction of pore water is calculated as:

$$\phi_{water} = WW_{water} \cdot \frac{\rho_b}{\rho_{water}} \qquad (10)$$

Here $\rho_b$ is the formation bulk density, which is a commonly available measurement.

For conventional reservoirs where there is no kerogen and the benefit of a good total porosity determination is available, one can solve for water chlorine concentration, and then water salinity for known type of salts, by independently computing both water and oil volumes and forcing the sum to be equal to the total pore volume. The relevant equations would be:

$$\phi_{water} = \frac{DW_{Cl} \cdot (1 - \phi_T) \cdot \rho_{ma}}{C_{Cl} \cdot \rho_{water}} \qquad (11)$$

$$\phi_{oil} = \frac{TOC \cdot (1 - \phi_T) \cdot \rho_{ma}}{X_C \cdot \rho_{oil}} \qquad (12)$$

$$\phi_T = \phi_{water} + \phi_{oil} \qquad (13)$$

Here $\phi_T$ is the total porosity, $\rho_{ma}$ is the density of the rock matrix which can be estimated as described in previously referenced Herron, S. L., et al. (2000) and in previously incorporated U.S. Pat. No. 6,571,619, and $\rho_{oil}$ is the density of the oil which is usually known from local knowledge.

This set of equations can be solved for the unknown water chlorine concentration as:

$$C_{Cl} \cdot \rho_{water} = \frac{DW_{Cl} \cdot (1 - \phi_T) \cdot \rho_{ma} \cdot X_C \cdot \rho_{oil}}{\phi_T X_C \cdot \rho_{oil} - TOC \cdot (1 - \phi_T) \cdot \rho_{ma}} \qquad (14)$$

Since $\rho_{water}$ only depends on $C_{Cl}$ for fixed temperature and pressure, it is simple to extract $C_{Cl}$ by solving the previous equation using a response model for water density. An example of simple, approximate response model for water would be:

$$\rho_{water} = 1 + 1.1701 \cdot C_{Cl} + 0.3435 \cdot C_{Cl}^2 + 1.5684 \cdot C_{Cl}^3 \qquad (15)$$

Solving for the water chlorine concentration with this model is equivalent to solving equation 14 for a specific positive and limited 4$^{th}$ degree polynomial root.

Another example of a method to solve for water chlorine concentration is to directly use the product $C_{Cl} \cdot \rho_{water}$ in another approximate equation as shown below:

$$C_{Cl} = 0.00048 + 0.96820 \cdot C_{Cl} \rho_{water} - 0.72034 \cdot (C_{Cl} \rho_{water})^2 \qquad (16)$$

The direct measurement of pore fluid chlorine concentration (DWCL) can advantageously replace the macroscopic thermal neutron cross section (Sigma) in formation evaluation workflows, as it does not depend on matrix properties other than density. In particular, matrix Sigma can be difficult to estimate, while matrix density can be estimated reliably, as described in previously referenced Herron, S. L., et al. (2000) and in previously incorporated U.S. Pat. No. 6,571,619.

DWCL can be combined with measurements that share the same approximate depth of investigation, such as the dielectric dispersion measurement. Both measurements cover similar radial zones, in the first few inches inside the formation. The method of combining these measurements can then be applied in conventional reservoirs with invasion or in unconventional reservoirs without invasion. Combining these measurements is of interest when the water salinity is high (be it filtrate or formation water), because in such cases the dielectric dispersion measurement loses its differential sensitivity to water volume and water salinity and requires an additional measurement to mitigate this loss of sensitivity. The Sigma measurement was proposed as an additional measurement by other authors, as in U.S. Patent Publication US20170176624A1 to Donadille at al. DWCL is a better candidate to support dielectric dispersion measurement as it is insensitive to varying and often unknown matrix Sigma.

For the method proposed below, the total porosity and the hydrocarbon type must be known a priori. This is a prerequisite of dielectric dispersion analysis in the present context.

Dielectric dispersion measurement is sensitive to water volume and water salinity but poorly sensitive to hydrocarbon type. Oil and gas have similar, low relative permittivity, and therefore the impact of hydrocarbon type on the dielectric measurement is weak. The response of the complex dielectric dispersion measurement can be formalized as follows:

$$\varepsilon^* = f_w(\phi_w, C_{Cl}, \phi_{hc}, \varepsilon_{hc}, \varepsilon_{ma}, X), \qquad (17)$$

where ω represents the propagating wave frequency, $\phi_w$, $C_{Cl}$ represent the water volume and Cl concentration respectively, $\phi_{hc}$, $\varepsilon_{hc}$ represent hydrocarbon volume and permittivity respectively, $\varepsilon_{ma}$ represents matrix permittivity, and X represents the so-called textural parameters that drive the frequency dispersion. Strictly speaking, dielectric dispersion is sensitive to water conductivity, which can be converted into a NaCl-equivalent salinity, $C_w$, so that in the previous equation, a known relation between chlorine concentration and NaCl-equivalent salinity is assumed. $\varepsilon_{ma}$ is derived from a spectroscopy mineralogical model. X is derived from the analysis of the frequency dispersion, so that in terms of information, the previous equation can be considered as a single complex equation after removing the frequency dependency and the textural parameters dependency. Dielectric dispersion is then the equivalent of two equations with four unknowns. Note that in any actual workflow however, the simultaneous estimation of bulk and textural water properties is required. When the water salinity is high, dielectric dispersion becomes equivalent to one single equation. This can be understood when using a simple CRIM (Complex Refractive Index Model), where the square root of the complex permittivity is found according to $$\sqrt{\varepsilon^*} = \phi_w \sqrt{\varepsilon_w^*} + (1 - \phi_w) \sqrt{\varepsilon_{ma}}, \qquad (18)$$

with $$\varepsilon_w^* = \varepsilon_w + \frac{i\sigma_w}{\omega \varepsilon_0}. \qquad (19)$$

The real part of the water permittivity is at maximum about 80, and at 1 GHz, $\omega \varepsilon_0$ is approximately 0.05S/m. Note that the conductivity is roughly proportional to the water salinity, so one can write $\sigma_w \sim \alpha C_{Cl}$ with the coefficient α depending mainly on temperature and salt type. At high salinity, 1 GHZ and 170 deg F, the square root becomes (with $C_{cl}$ in ppk):

$$\sqrt{\varepsilon_w^*} \sim \frac{1+i}{\sqrt{2}} \sqrt{7C_{Cl}} \left(1 - i\frac{11}{C_{Cl}}\right). \quad (20)$$

As the matrix permittivity is at maximum about 9, it follows that both real permittivity and conductivity are mainly driven by the product $\phi_w^2 C_{Cl}$. In a more general manner, calling MN the textural parameter of the water phase, the permittivity and conductivity at high salinity will be driven by the product $\phi_W^{MN} C_{Cl}$.

The DWCL measurement is written:

$$DWCL = \frac{\phi_w \rho_w C_{Cl}}{(1-\phi_w-\phi_{hc})\rho_{ma}}, \quad (21)$$

and it is mainly driven by $\phi_w \rho_w C_{Cl}$ (as is Sigma).

One can confirm that dielectric dispersion and DWCL measurements do not share the same dependency on water salinity and water volume at high salinity. One can then combine these two measurements within a single simultaneous inversion to obtain robust water volume and water chlorine concentration (or equivalently salinity) independently. This new workflow mitigates the loss of differential sensitivity of dielectric dispersion alone at high salinity.

When the pore water salinity is low enough for the dielectric measurement to be able to independently estimate both water volume $\phi_W$ and water NaCl-equivalent salinity $C_w$, the additional knowledge of DWCL enables the derivation of a salt chlorine index, which corresponds to the weight fraction of chlorine in water divided by the weight fraction of chlorine if the water was holding purely NaCl salt. The actual chlorine weight fraction in pore water is $$C_{Cl} = \frac{DWCL(1-\phi_T)\rho_{ma}}{\phi_w \rho_w}. \quad (22)$$

In equation (22), the water salinity is a weak function of the actual salinity and salt type, but it can be assumed in a first approximation that it can be derived from the knowledge of $C_{Cl}$. The equation above can then be solved for $C_{Cl}$. The NaCl-equivalent chlorine weight fraction estimated from the dielectric measurement is $$C_{Cl,eq} = \frac{C_w}{1.648} \quad (23)$$

The salt chlorine index is then $$CLI = \frac{C_{Cl}}{C_{Cl,eq}} \quad (24)$$

The salt chlorine index is not a simple function of weight fraction of Cl in different types of salts, but it also contains a dependency on the impact on salt concentration to water conductivity.

In the method proposed below, the total porosity and hydrocarbon properties are unknowns that can be estimated simultaneously with water volume and water salinity. It is assumed that matrix properties such as matrix density and permittivity are known, as these can be derived from spectroscopy.

DWCL and dielectric dispersion, as described in the previous section, are measurement inputs for this method. The measurement of total organic carbon (TOC) is added to the input. It is sensitive to the carbon mass fraction, and through this parameter, it is sensitive to the hydrocarbon type.

$$TOC = \frac{\phi_{hc} \rho_{hc} \chi_c}{(1-\phi_w-\phi_{hc})\rho_{ma}}. \quad (25)$$

It is possible to build a model that relates hydrogen index ($HI_{hc}$), carbon mass fraction ($\chi_{hc}$) and permittivity ($\varepsilon_{hc}$) of hydrocarbon to the unique hydrocarbon density parameter. Then by using such a model, all properties of hydrocarbon are linked together and can be reduced to only one single parameter, which is hydrocarbon density. This follows a logic such that one can write $$HI_{hc} = f(\rho_{hc}) \quad (26)$$

$$\chi_{hc} = g(\rho_{hc}) \quad (27)$$

$$\varepsilon_{hc} = h(\rho_{hc}) \quad (28)$$

Finally, a porosity-sensitive measurement, such as formation bulk density, neutron porosity or NMR porosity can be added to the method. This measurement should be sensitive to either the density of the phases in the formation or to their hydrogen indices, but not strongly sensitive to the water salinity.

By combining all these measurements, a good differentiation of the sensitivity of the measurements is obtained with the following parameters: dielectric dispersion with sensitivity to $\phi_W^{MN} C_{Cl}$; DWCL with sensitivity to $\phi_w \rho_w C_{cl}$; TOC with sensitivity to $\phi_{hc} \rho_{hc} \chi_c$; and density with sensitivity to $\phi_w \rho_w$, $\phi_{hc} \rho_{hc}$ or Neutron or NMR to $\phi_w HI_w$, $\phi_{hc} HI_{hc}$.

By combining these measurements into a single inversion, it is then possible to estimate simultaneously the water volume, the hydrocarbon volume, the water salinity and the hydrocarbon density.

The macroscopic thermal neutron cross section (or Sigma) measurement is sensitive to the chlorine concentration in the water, but it is also sensitive to the hydrocarbon through its hydrogen index and to the matrix Sigma. Explicitly separating the sensitivity of water chlorine inside the Sigma response equation, one can write $$\Sigma_b = \phi_w \cdot (22 + 0.348 C_{Cl}) \rho_w + \phi_{hc} \cdot 22 HI_{hc} + (1-\phi_w-\phi_{hc}) \cdot \Sigma_{ma}. \quad (29)$$

In this example, the Sigma value of fresh water is assigned to be 22 c.u., and the same value is assigned to hydrocarbons with hydrogen index equal to that of water. One significant difficulty of Sigma measurement interpretation is the uncertainty in the matrix Sigma ($\Sigma_{ma}$). Some trace elements such as B and Li have large capture cross sections and can contribute significantly to matrix Sigma but are not often analyzed in spectroscopy. These trace elements can be present in varying quantities, especially in clays, and they are rarely well-correlated to measured elements such as K, Al, Ti, or Gd because their concentrations depend on the depositional system. It is therefore important to calibrate the matrix Sigma whenever possible to support the value used in the Sigma interpretation.

Equation (29) can be transformed into $$\sum_{ma} = \frac{\sum_b - \phi_w(22 + 0.348C_{Cl})\rho_w - \phi_{hc} \cdot 22HI_{hc}}{1 - \phi_w - \phi_{hc}} \quad (30)$$

If the methodology described in the previous section is applied beforehand to extract water and hydrocarbon volume, water salinity and hydrocarbon type, then all the parameters of the right-hand side of the equation are known, and a solution is available for the matrix Sigma.

Figure 8:
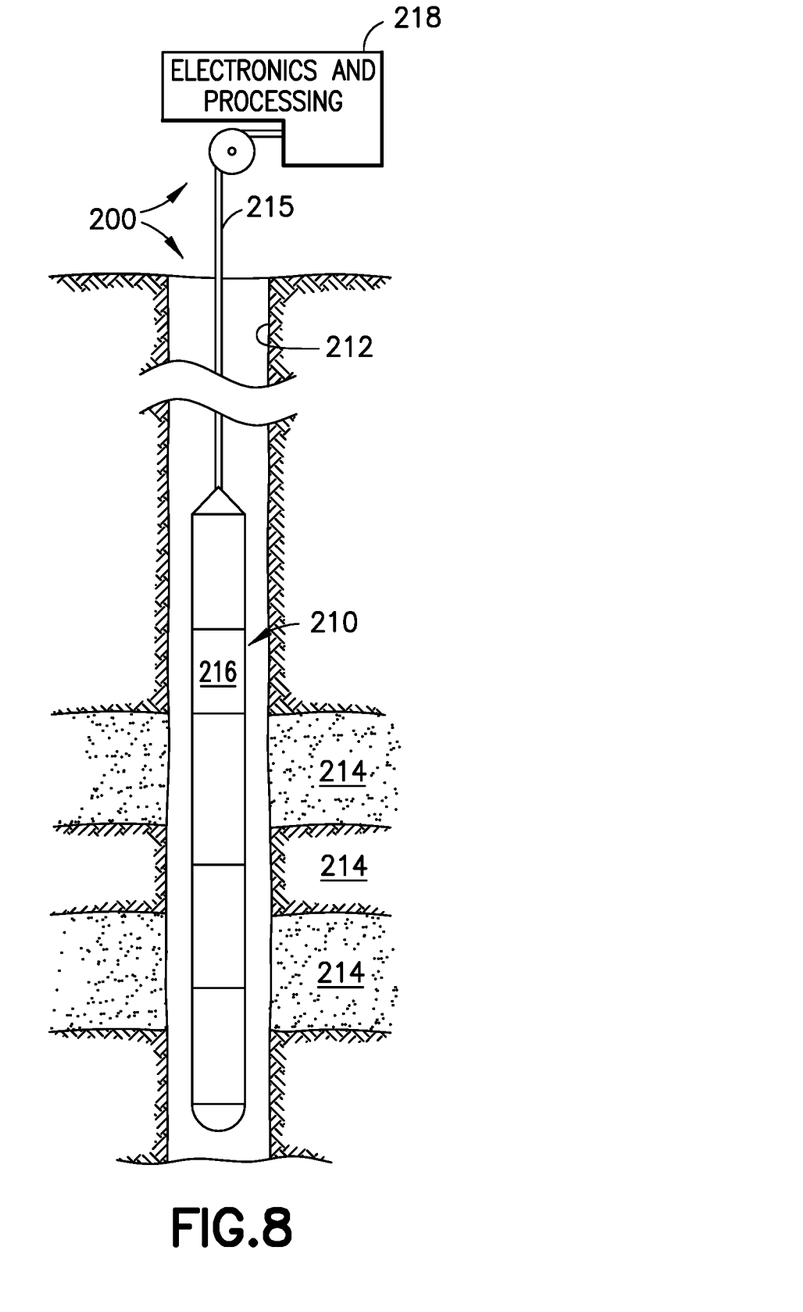
FIG. 8 is a schematic of a borehole tool and system for generating the logs of FIG. 6.

Turning now to FIG. 8, a logging system 200 is shown including a borehole tool 210 extended in a borehole (wellbore) 212 traversing a formation 214. The tool 210 is shown suspended from the lower end of a multiconductor cable 215 that is spooled in a usual fashion on a suitable winch (not shown) on the formation surface. On the surface, the cable may be electrically coupled to an electrical control system 218. The tool may be an elemental capture spectroscopy sonde including an elongated body that may include a standard neutron source and a standard gamma-ray detector (not shown). The surface control system 218 may communicate with the tool via a downhole control system 216. The downhole control system 216 may also process information detected by the detectors of the tool and process them for transmission uphole. The electronics and control system 218 may include processors for processing raw and/or pre-processed information. Thus, by way of example, for each location of interest in the borehole, the electronics and control system 218 may make any of the determinations discussed above in order to quantify the concentration of an element in at least one of the formation, borehole, or another region surrounding the borehole. System 218 may then plot that determination (and any other log information of interest) as a function of depth in the formation in the form of a log (e.g., FIG. 6) which may be on paper or in electronic form (e.g., on a monitor). In addition, the electronics and control system 218 may utilize the determined elemental concentration(s) in conjunction with known information or other determinations to determine (by way of example only) one or more of the following: estimate water volume; estimate water salinity; derive pore water salt chlorine index; and estimate formation hydrocarbon density. Any or all of these determinations may be shown in log format as a function of location in the formation. It will be appreciated that by being able to quantify the concentration of an element in a region (e.g., the borehole, the formation, the casing, etc.) apart from other regions, many valuable determinations may be made in conjunction with other information. Ultimately, those determinations may then be used, e.g., to determine whether and how to produce hydrocarbons from the formation.

Some of the methods and processes described above, are typically performed by a processor. The term "processor" should not be construed to limit the embodiments disclosed herein to any particular device type or system. The processor may include a computer system. The computer system may also include a computer processor (e.g., a microprocessor, microcontroller, digital signal processor, or general purpose computer) for executing any of the methods and processes described above.

The computer system may further include a memory such as a semiconductor memory device (e.g., a RAM, ROM, PROM, EEPROM, or Flash-Programmable RAM), a magnetic memory device (e.g., a diskette or fixed disk), an optical memory device (e.g., a CD-ROM), a PC card (e.g., PCMCIA card), or other memory device.

Some of the methods and processes described above, can be implemented as computer program logic for use with the computer processor. The computer program logic may be embodied in various forms, including a source code form or a computer executable form. Source code may include a series of computer program instructions in a variety of programming languages (e.g., an object code, an assembly language, or a high-level language such as C, C++, python or JAVA). Such computer instructions can be stored in a non-transitory computer readable medium (e.g., memory) and executed by the computer processor. The computer instructions may be distributed in any form as a removable storage medium with accompanying printed or electronic documentation (e.g., shrink wrapped software), preloaded with a computer system (e.g., on system ROM or fixed disk), or distributed from a server or electronic bulletin board over a communication system (e.g., the Internet or World Wide Web).

Alternatively or additionally, the processor may include discrete electronic components coupled to a printed circuit board, integrated circuitry (e.g., Application Specific Integrated Circuits (ASIC)), and/or programmable logic devices (e.g., a Field Programmable Gate Arrays (FPGA)). Any of the methods and processes described above can be implemented using such logic devices.

While the disclosure describes a limited number of embodiments, those skilled in the art, having benefit of this disclosure, will appreciate that other embodiments can be devised which do not depart from the scope of the invention hereof. Accordingly, the scope of the invention should be limited only by the attached claims. Moreover, embodiments described herein may be practiced in the absence of any element that is not specifically disclosed herein.

In the claims, means-plus-function clauses are intended to cover the structures described herein as performing the recited function and not only structural equivalents, but also equivalent structures. Thus, although a nail and a screw may not be structural equivalents in that a nail employs a cylindrical surface to secure wooden parts together, whereas a screw employs a helical surface, in the environment of fastening wooden parts, a nail and a screw may be equivalent structures. It is the express intention of the applicant not to invoke 35 U.S.C. § 112, paragraph 6 for any limitations of any of the claims herein, except for those in which the claim expressly uses the words 'means for' together with an associated function.

The invention claimed is:

1. A method for investigating an earth formation traversed by a borehole, comprising:
    locating a borehole tool having a neutron source and a photon detector in the borehole and obtaining photon scatter information from at least two different regions in or about the borehole;
    wherein the at least two different regions in or about the borehole include at least two of the borehole, a steel casing extending in the borehole, a cement annulus around the steel casing, and the earth formation; and
    quantifying a concentration of a chemical element located in at least one of the at least two different regions in or about the borehole by using the photon scatter information and at least two different spectral standards for the chemical element specific for each of the at least two different regions.

2. The method of claim 1, wherein at least one of the at least two different regions is located in the earth formation.

3. The method of claim 1, wherein the chemical element is at least one of, Cl, Ca, Si, C, O, H, and Fe.

4. The method of claim 3, wherein the chemical element is Cl.

5. The method of claim 3, wherein the at least two different spectral standards comprise a formation chlorine spectral standard and a borehole chlorine spectral standard, and the quantifying the concentration of the chemical element located in the at least one of the at least two different regions in or about the borehole comprises removing a chlorine contribution from the borehole to infer a formation chlorine yield.

6. The method of claim 5, wherein the quantifying the concentration of the chemical element located in the at least one of the at least two different regions in or about the borehole includes measuring and calibrating scattering differences as a function of at least one of a size of a borehole and formation a formation density.

7. The method of claim 5, further comprising:
determining an estimate of a formation water volume by using the formation chlorine yield.

8. The method of claim 7, further comprising:
estimating at least one of a concentration of chlorine in water and a salinity by using the formation chlorine yield.

9. The method of claim 1, further comprising:
moving the borehole tool in the borehole and for multiple locations of the borehole tool, quantifying the concentration of the chemical element located in the at least one of the at least two different regions in or about the borehole by using the photon scatter information and the at least two different spectral standards for the chemical element and gamma-ray scatter information, and providing a log of the concentration of the chemical element as a function of a location in the earth formation.

10. The method of claim 9, further comprising:
determining a property of the earth formation by utilizing the quantified concentration of the chemical element.

11. The method of claim 10, wherein the property of the earth formation is at least one of a lithology and a content of fluids in the earth formation.

12. The method of claim 11, further comprising:
determining whether and how to produce hydrocarbons from the earth formation based on the determined property of the earth formation.

13. A method of investigating a geological formation traversed by a wellbore, comprising:
placing a downhole tool having a neutron source into the wellbore in the geological formation;
emitting neutrons from the neutron source to cause reactions in and about the wellbore that generate photons;
detecting spectra of the photons using the downhole tool;
analyzing the detected spectra using at least two standards for at least one chemical element to quantify a concentration of the at least one chemical element in at least one specific region in or about the wellbore;
wherein the at least one chemical element is chlorine, and the at least two standards for the at least one chemical element include a first standard representing gamma-ray scattering of chlorine in the wellbore and a second standard representing gamma-ray scattering of chlorine in the geological formation;
wherein the at least two standards for the at least one chemical element include a first standard representing gamma-ray scattering of the at least one chemical element in the wellbore and a second standard representing gamma-ray scattering of the at least one chemical element in the geological formation, and elemental yields for the at least two standards for the at least one chemical element are combined with a correction function to remove a gamma-ray contribution of the wellbore from a total yield in order to obtain a formation yield; and
determining a property of the at least one specific region.

14. The method of claim 13, wherein the at least two standards include a difference standard between a first standard representing gamma-ray scattering of the at least one chemical element in a first region in or about the wellbore and a second standard representing gamma-ray scattering of the at least one chemical element in a second region in or about the wellbore.

15. The method of claim 13, wherein the at least one chemical element is selected from Cl, Ca, Si, C, O, H, and Fe.

16. The method of claim 15, wherein the at least one element is chlorine, the formation yield is a formation chlorine yield, and the method further comprises estimating a formation water volume by using the formation chlorine yield.

17. The method of claim 15, wherein the at least one element is chlorine, the formation yield is a formation chlorine yield, and the method further comprises estimating a formation water chlorine concentration by using the formation chlorine yield.

18. The method of claim 15, wherein the at least one element is chlorine, the formation yield is a formation chlorine yield, and the method further comprises estimating a formation water volume and a chlorine concentration simultaneously by using the formation chlorine yield in combination with at least one additional measurement.

19. The method of claim 18, wherein an at least one additional measurement comprises at least one of a dielectric permittivity and a thermal neutron capture cross section.

20. The method of claim 13, wherein the at least one specific region in or about the wellbore is selected from the wellbore, a steel casing lining the wellbore, a cement annulus around the steel casing, the geological formation, and a tool background.

* * * * *